E. T. STEPHENS.
PORTABLE STRETCHING DEVICE.
APPLICATION FILED AUG. 28, 1908.

906,828.

Patented Dec. 15, 1908.

Witnesses.

Inventor.

UNITED STATES PATENT OFFICE.

EDGAR THOMPSON STEPHENS, OF TORONTO, ONTARIO, CANADA.

PORTABLE STRETCHING DEVICE.

No. 906,828.　　　　Specification of Letters Patent.　　　Patented Dec. 15, 1908.

Application filed August 28, 1908. Serial No. 450,666.

*To all whom it may concern:*

Be it known that I, EDGAR THOMPSON STEPHENS, of the city of Toronto, in the county of York and Province of Ontario, Canada, have invented certain new and useful Improvements in Portable Stretching Devices; and I hereby declare that the following is a full, clear, and exact description of the same.

This invention relates to a portable stretching device by which the wire fabrics of spring mattresses and other articles of manufacture can be stretched to the required tension.

The invention will be described in connection with a woven wire mattress; and it consists essentially of a two-part clamp to engage the opposite sides of the wire fabric transversely to the length of the mattress frame; a pressure screw to be connected to the mattress frame at each side thereof and provided with a tool receiving part by which it can be revolved; a traveling nut movable lengthwise of the pressure screw; and two stretcher arms hinged to the traveling nut on opposite sides of the pressure screw, one of the stretcher arms being arranged to engage with a stationary abutment, and the other arm being arranged to engage with the two-part clamp, so that as the pressure screw is revolved the stretcher arms will straighten and force the two-part clamp to stretch the wire fabric.

For an understanding of the invention reference is to be had to the following description and to the accompanying drawings in which:—

Figure 1:
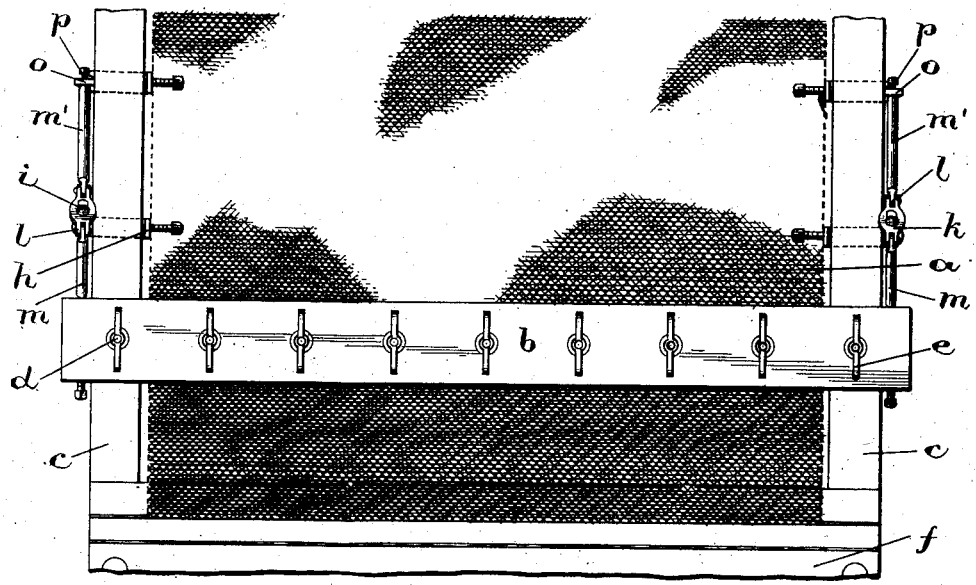
Figure 2:
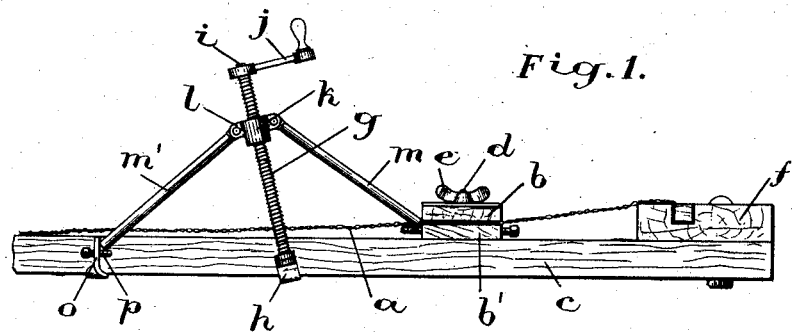
Figure 2A:
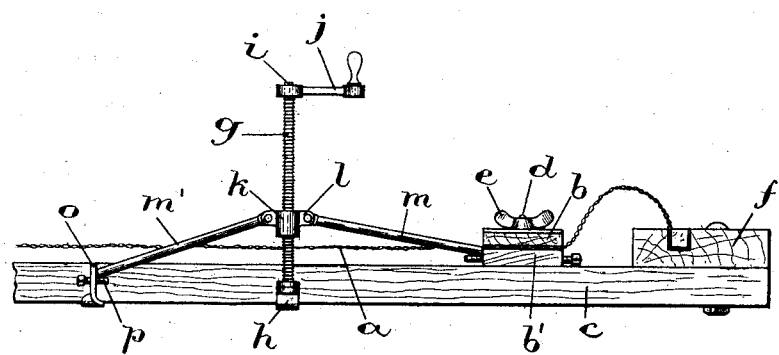

Figure 1 is a plan view of a part of a woven wire mattress showing the application of the portable stretching device. Fig. 2 is a side elevation of the same showing the pressure screw and stretcher arms in their initial position. Fig. 2ª is a similar view to Fig. 2, showing the parts in their final position.

Like characters of reference refer to like parts throughout the specification and drawings.

This apparatus may be used for the purpose of stretching any article of manufacture capable of being stretched, and it is particularly intended for stretching the wire fabric of a new or old mattress to the required tension. When stretching the wire fabric $a$ it is necessary to use a two part clamp, the parts $b$ $b'$ of which are placed on opposite sides of the wire fabric $a$ transversely to the length of the side rails $c$ of the mattress frame, and bolted together by bolts $d$ and nuts $e$. The two-part clamp is placed near that end of the wire fabric $a$ to be detached from and reattached to the end rail $f$ and is moved in the direction of the end rail $f$ by the stretching device hereinafter described.

The stretching device consists of a pressure screw $g$ revolubly and rockably connected to the screw holding clamp $h$ to be stationarily and detachably connected to the side rail of the mattress frame. The pressure screw $g$ is of a suitable length and at the opposite end to the screw holding clamp $h$ is formed with a crank receiving part $i$ upon which is placed the crank $j$.

Movable on the pressure screw $g$ is a traveling nut $k$ provided with projecting lugs $l$ to which are hinged the stretcher arms $m$ $m'$. The free end of the stretcher arm $m$ engages with the two part clamp and the free end of the stretcher arm $m'$ engages with an abutting clamp $o$ stationarily and detachably connected to the side rail $c$, on the opposite side of the pressure screw to the two-part clamp.

To prevent the displacement of the free end of the stretcher arm $m'$ from the abutting clamp, the latter is formed with a pin $p$ which engages the stretcher arm $m'$. The two part clamp is fastened to the wire fabric $a$ and the stretching device is attached to the mattress frame, as shown in the drawings, with the screw holding clamp $h$ positioned upon the side rail $c$ at a distance from the abutting clamp $o$ equal to or slightly less than the length of the stretcher arm $m'$ so that the pressure screw in its initial position will be oblique to the top surface of the side rail inclining in the direction of the abutting clamp $o$, this position of the pressure screw being shown in Fig. 2 of the drawings.

The end of the stretcher arm $m$ engages with the two-part clamp which is located at its initial position near the pressure screw with the traveling nut $k$ close to the crank $j$ so that during the revolution of the pressure screw the nut will move in the direction of the screw-holding clamp $h$. When the traveling nut is positioned near the crank $j$ the stretcher arms are inclined respectively from the two-part clamp and abutting clamp to the traveling nut. During the movement of the traveling nut towards the screw-holding clamp the stretcher arms straighten and press the two-part clamp away from the pressure screw to stretch the wire fabric to the required tension and securely hold it until it can be detached from and reattached to the end rail *f* when the slack has been taken up, the pressure screw during the straightening movement of the stretcher arms moving from the position shown in Fig. 2 to that shown in Fig. 2ª. When the slack of the wire fabric *a* has been taken up and the wire fabric has been reattached to the end rail *f* the stretching device and the two part clamp can be disconnected from the mattress.

For clearness, only one stretcher has been described; but it is evident that in mattress stretching two such devices would be used, one at each side of the frame, as shown in Fig. 1; and as many as desired might be used in other operations, according to the nature of the work.

Having thus fully described my invention what I claim as new and desire to secure by Letters Patent is:—

1. A portable stretching device comprising a clamp, a pressure screw, a traveling nut upon the pressure screw, and two stretcher arms hinged to the traveling nut to actuate the clamp.

2. A portable stretching device comprising a two-part clamp, a pressure screw, a clamp to revolubly and rockably hold the pressure screw, a traveling nut on the pressure screw, and two stretcher arms hinged to the traveling nut to actuate the two-part clamp.

3. A portable stretching device comprising a two-part clamp, a pressure screw, a clamp to revolubly and rockably hold the pressure screw, a traveling nut on the pressure screw, two stretcher arms hinged to the pressure screw, and an abutting clamp to engage one of the stretcher arms, the other stretcher arm engaging with the two-part clamp.

Toronto, Aug. 19th, 1908.

EDGAR THOMPSON STEPHENS.

Signed in the presence of—
C. H. RIEBER,
N. R. ROBERTSON.